May 27, 1941. E. N. LOWRY 2,243,351
RING FORMING MACHINE
Filed Aug. 23, 1939 10 Sheets-Sheet 1

INVENTOR:
Edward N. Lowry,
BY Bodell & Thompson
ATTORNEYS.

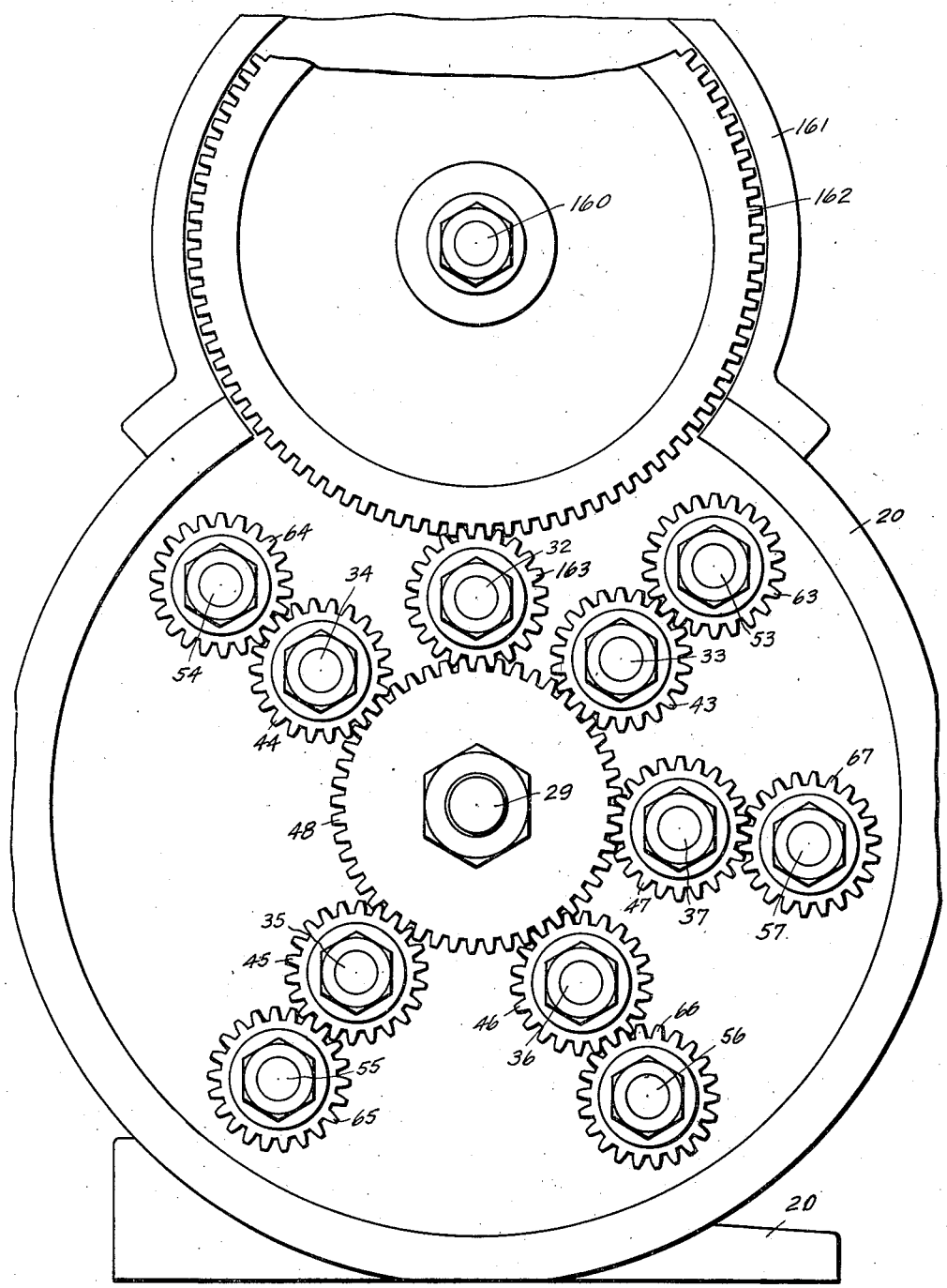

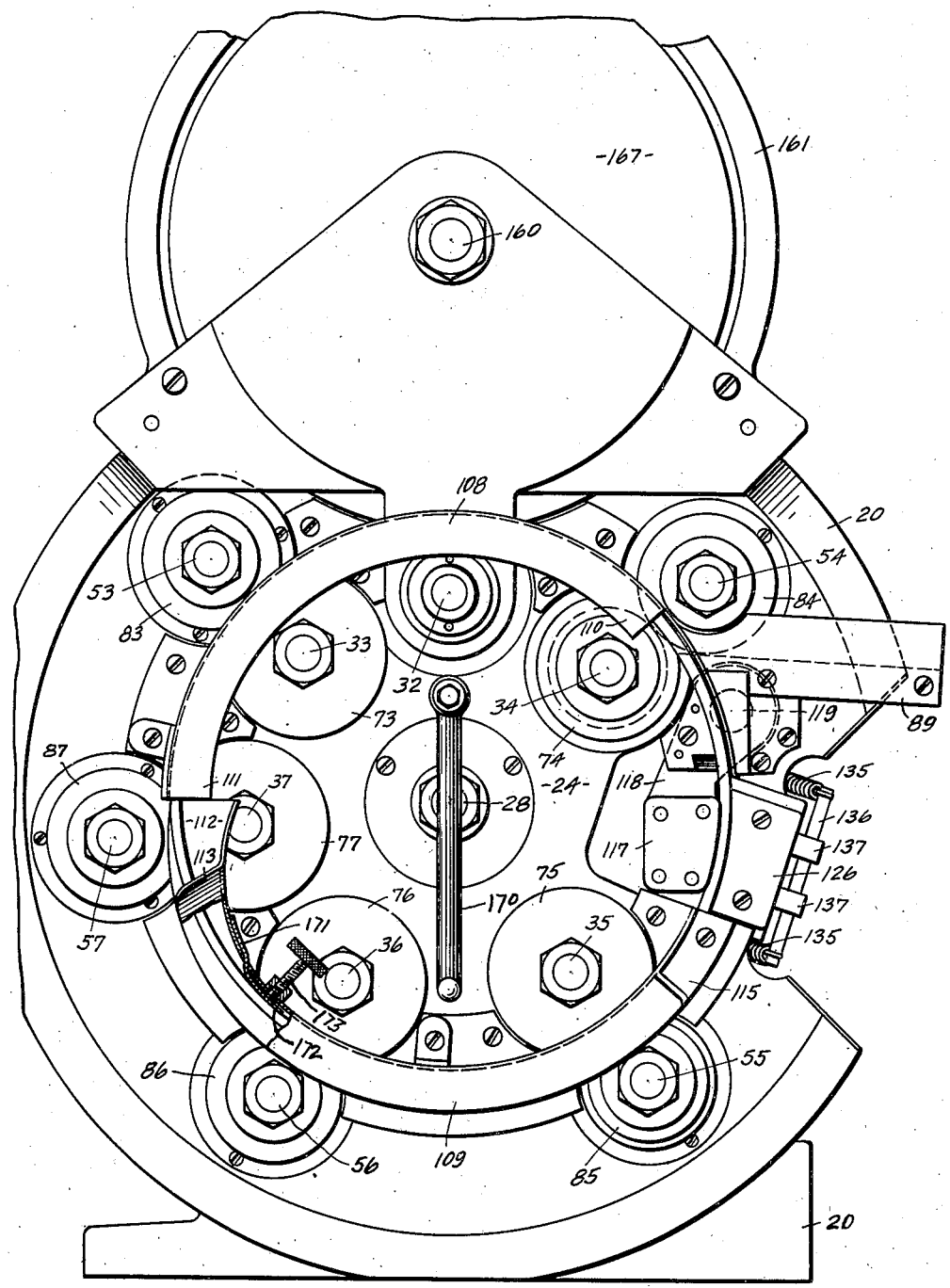

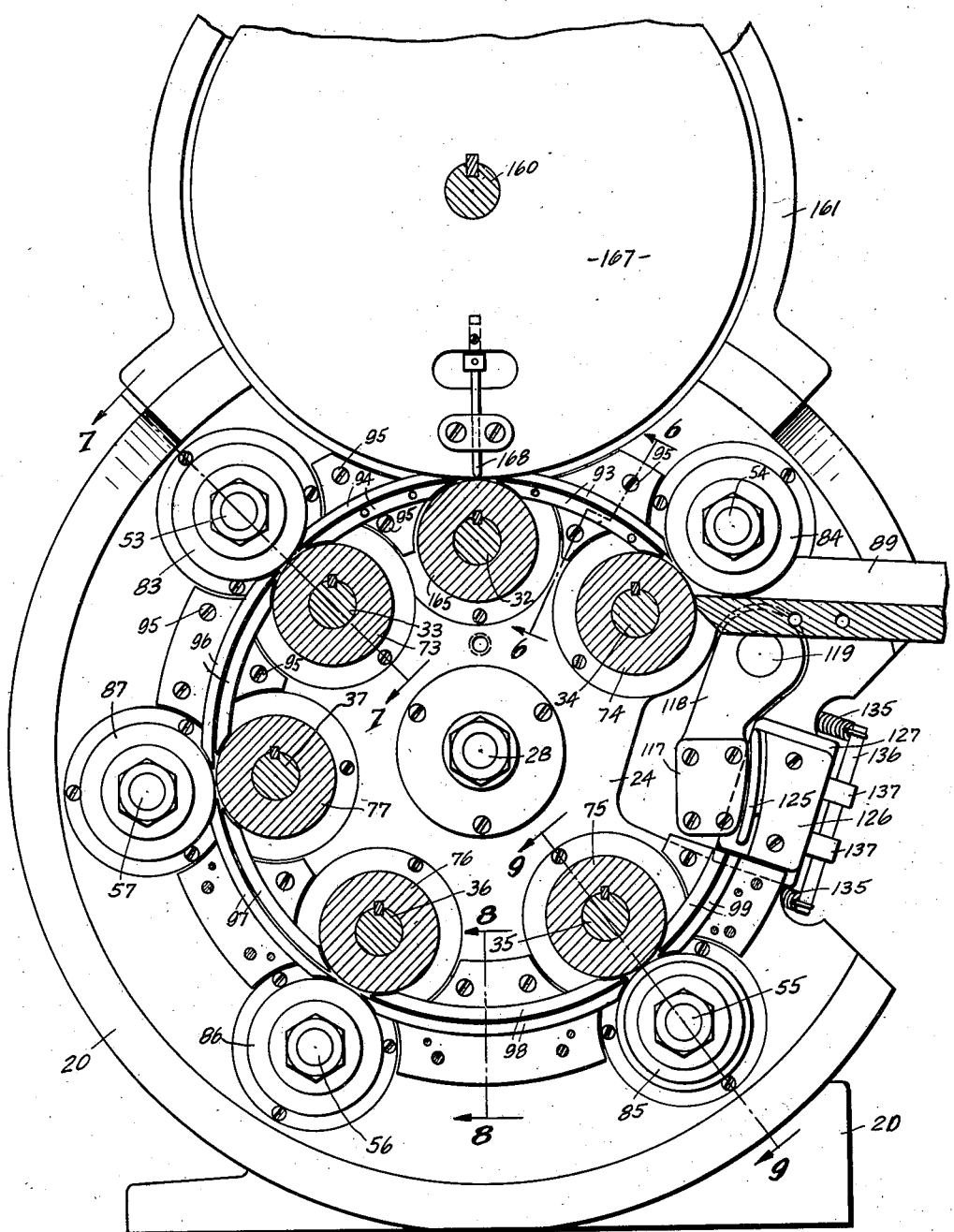

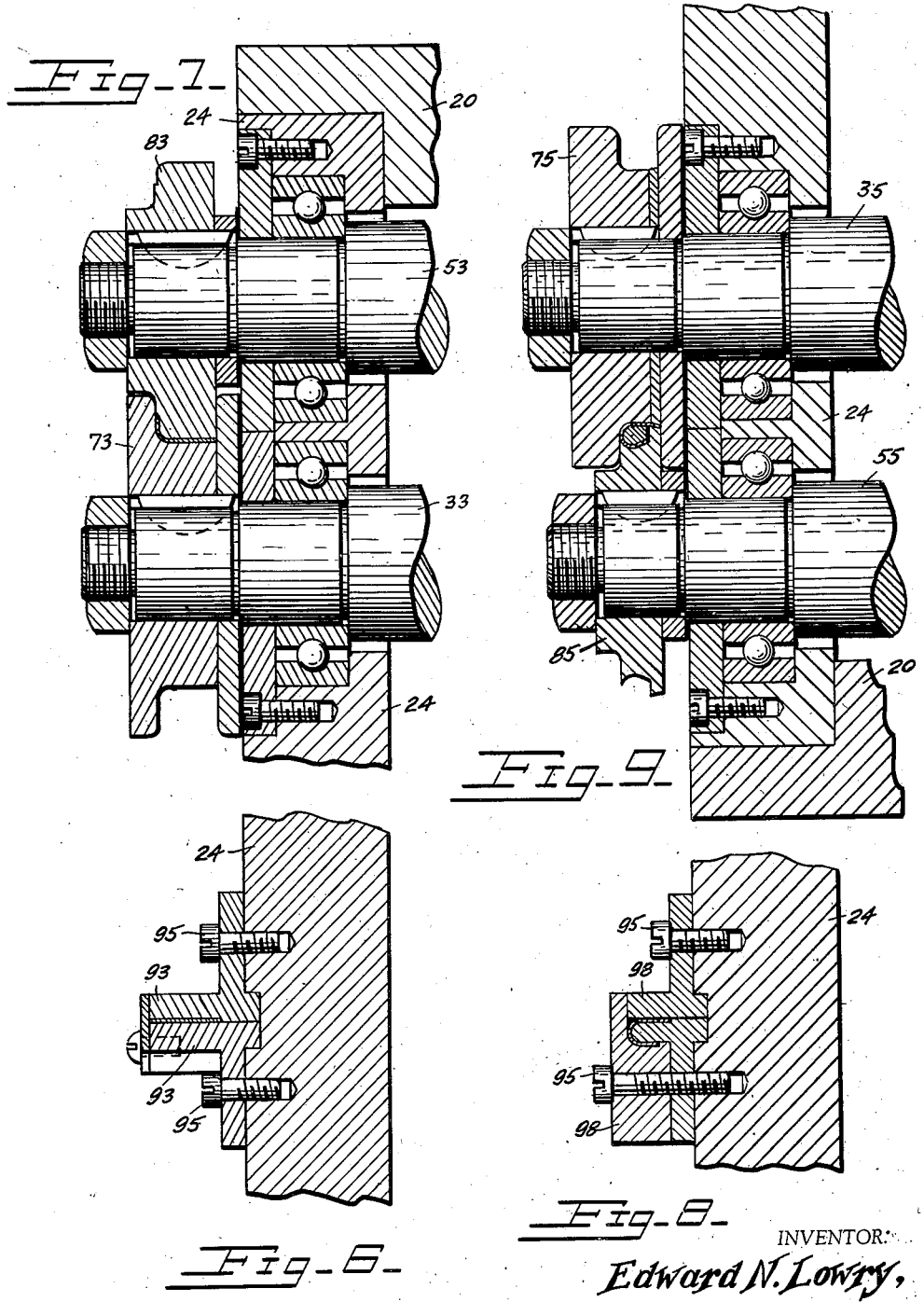

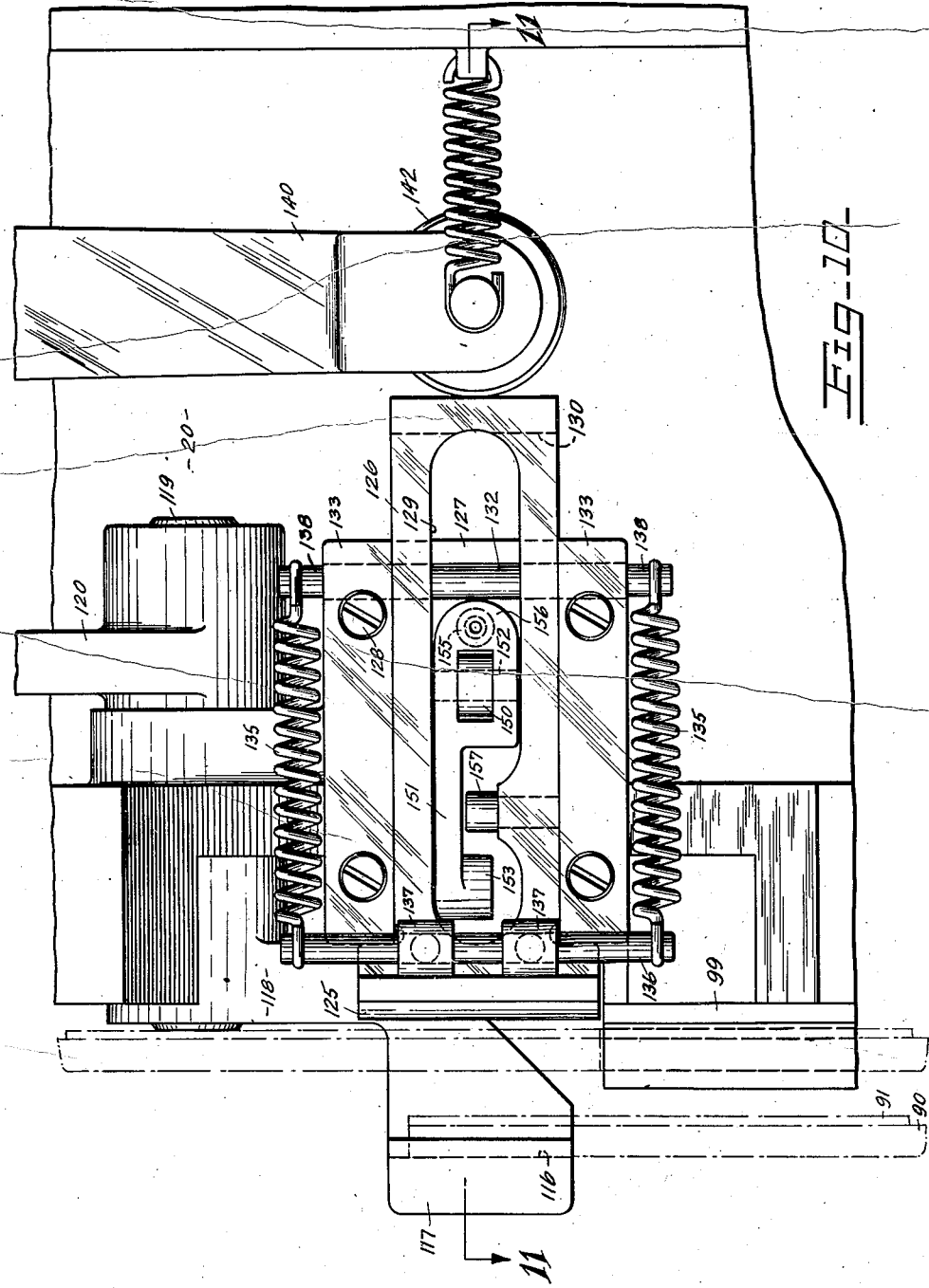

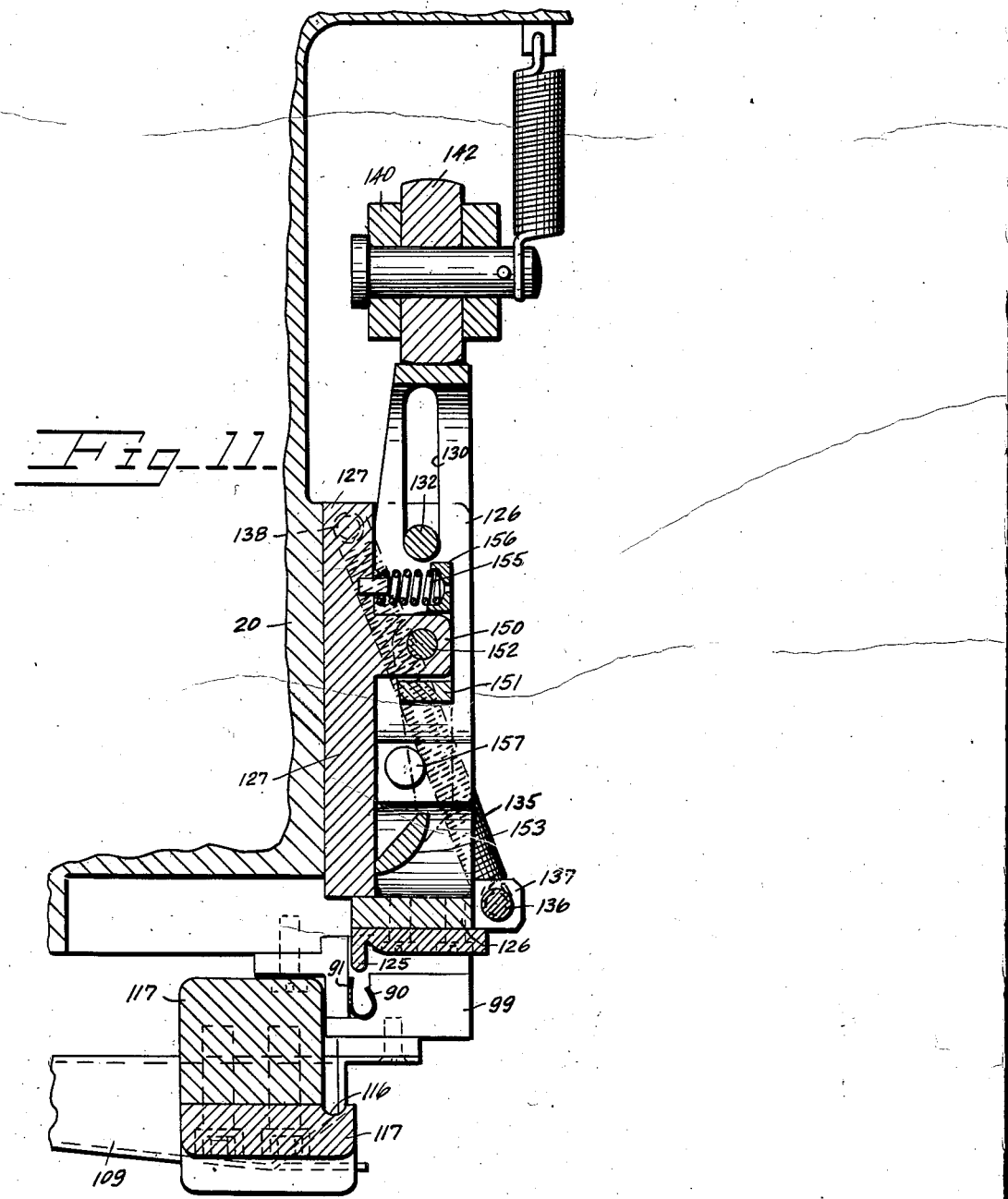

May 27, 1941.  E. N. LOWRY  2,243,351
RING FORMING MACHINE
Filed Aug. 23, 1939  10 Sheets-Sheet 9

INVENTOR:
Edward N. Lowry,
BY Bodell & Thompson
ATTORNEYS.

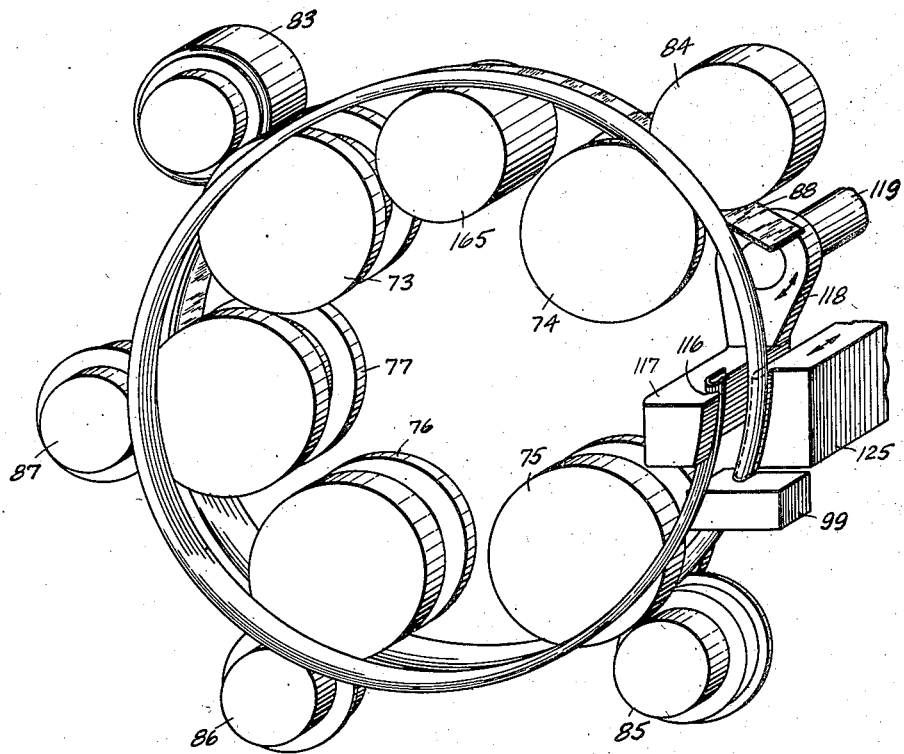
Fig_14.

Patented May 27, 1941

2,243,351

UNITED STATES PATENT OFFICE 2,243,351

RING FORMING MACHINE

Edward N. Lowry, Syracuse, N. Y.

Application August 23, 1939, Serial No. 291,595

10 Claims. (Cl. 153—2)

This invention relates to a machine for forming circular members from a strip of flat material. More particularly, the invention relates to a machine for continuously forming ring members of a desired cross-section from a strip of thin metal. The machine to which particular reference is herein made is intended to form ring members more or less U-shaped in cross-section from a thin strip of metal, the rings being subsequently employed in connection with the fabrication of containers made of fibrous material, such as paper board.

The invention has as an object a machine which is operable automatically to continuously form the rings rapidly, the machine being operable to form one hundred or more completed rings per minute.

The invention has as a further object a machine of the type referred to embodying a structure operable to automatically and continuously form the rings, sever the trailing end of the formed portion from the strip and interlock the same with the leading end thereof to form a complete ring member suitable for use without any further forming.

The invention resides in the novel features and in the combinations and constructions hereinafter set forth and claimed.

In describing this invention, reference is had to the accompanying drawings in which like characters designate corresponding parts in all the views.

Figure 3 is a rear elevational view of the machine with the rear cover plate of the machine removed.

Figure 4 is a front elevational view of the machine.

Figure 5 is a view similar to Figure 4 with parts removed and parts shown in section.

Figures 6, 7, 8 and 9 are sectional views of the forming mechanism taken on lines 6—6, 7—7, 8—8 and 9—9, respectively, of Figure 5.

Figure 10 is a side elevational view of the cutting mechanism operable to sever the trailing end of the formed ring from the strip and to interlock the same with the leading end of the formed portion.

Figure 11 is a sectional view of the cutting mechanism taken on line 11—11, Figure 10.

Figure 12:
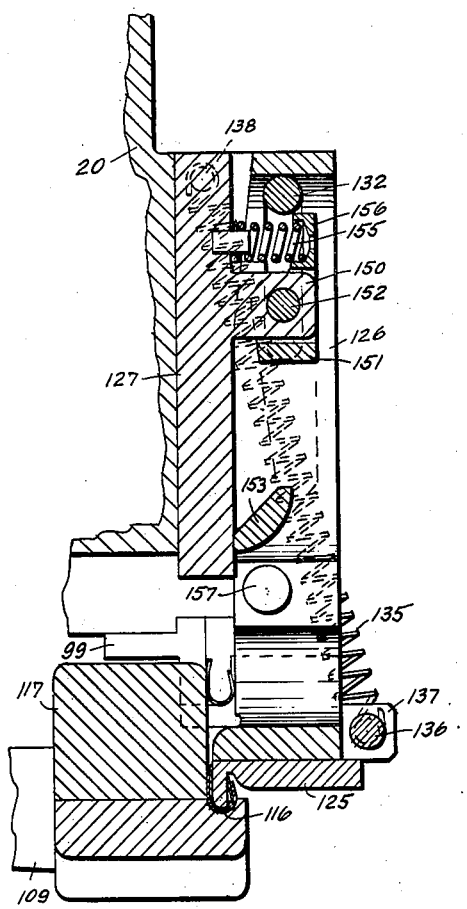

Figure 12 is a view similar to Figure 11 illustrating the cutting mechanism, after the same has been actuated to sever the formed ring from the strip.

Figure 13:
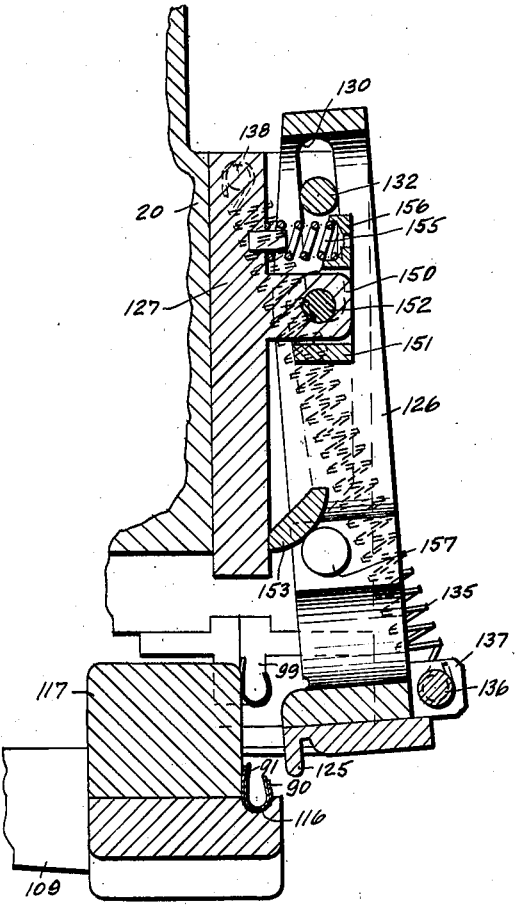

Figure 13 is a view similar to Figure 12 illustrating the return movement of the cutting mechanism.

Figure 14 is a schematic view illustrating the formation of the ring from the flat strip.

As previously stated, the general object of this invention resides in the structure of the machine, whereby the flat strip is fed into the machine continuously and the rings are rolled up and formed of the desired cross-section, the formed ring severed from the strip and the ends of the ring interlocked, all during the continuous and uninterrupted movement of the strip.

An important feature of the invention resides in the particularly compact and economical structure of the machine, whereby the general object of the invention is carried out.

The frame of the machine includes a cylindrical member 20 mounted upon a base plate 21 and secured thereto, as by screws 22. The base plate 21 is supported by a suitable column 23. A disk 24 is secured in the forward end of the cylindrical member 20 and a disk 25 secured in the rear end thereof. The disks 24, 25 are secured to the cylindrical member, as by screws 26.

The disks 24, 25 are formed with alined apertures centrally located, and in which a central power shaft 28 is rotatably journalled in antifriction bearings. The shaft 28 is provided with a rearwardly extending portion 29 which is operatively connected to a driving motor 30 also mounted upon the base plate 21.

The disks 24, 25 are also provided with a plurality of alined apertures spaced radially from the power shaft 28 and spaced apart from each other circumferentially. A shaft 32 is journalled in one pair of these apertures arranged directly above the power shaft 28. A series of forming roll shafts 33, 34, 35, 36 and 37 are journalled in certain of said apertures, each being provided on the rearwardly extending portion thereof with a gear 43, 44, 45, 46 and 47, respectively, all of which are arranged to mesh with a driving gear 48 secured to the rearwardly extending portion 29 of the central power shaft 28.

A second series of forming roll shafts 53, 54, 55, 56 and 57 are journalled in the remaining apertures and are provided with gears 63, 64, 65, 66, 67 arranged to mesh with the gears 43, 44, 45, 46, 47, respectively.

The shafts 33 to 37 and 53 to 57 and the shaft 32 are all arranged in parallel relationship and are all operated at the same speed by the driving gear 48. The gears are enclosed by a removable cover 70. The shafts 33 to 37 inclusive are provided on the forwardly projecting end with forming rolls 73, 74, 75, 76, 77 respectively, and the shafts 53 to 57 inclusive are provided with complemental rolls 83, 84, 85, 86, 87, respectively. The first pair of rolls 74, 84 are of cylindrical formation and the flat strip 88 is fed into the machine between these rolls. The strip 88 is arranged in the form of a roll mounted upon a freely rotatable reel, not shown, arranged adjacent the machine, and the strip is fed between the rolls 74, 84 through a trough-shaped member 89. The strip is directed to each succeeding pair of rolls by track sections hereinafter described, and each pair of rolls is formed to progressively form the strip into the desired cross-section. The cross-section of the ring formed by the machine herein described is substantially U-shaped with one of the walls, as 90, being of less width than the opposite wall 91. The cross-section of the formed ring is shown in Figures 11, 12, 13 and 14.

The second pair of rolls 73, 83 are formed on their periphery to bend one side of the flat strip at substantially right angles. The succeeding rolls 77, 87, 76, 86 successively bend the bent portion at a greater angle and the last pair of rolls 75, 85 form the ring in its final formation (see Figures 7 and 9). Accordingly, as the flat stock is fed into the machine, it is bent into circular or ring form and simultaneously is shaped to the cross-sectional form desired.

The strip is fed from one pair of rolls to the succeeding pair by track sections arranged intermediate the pairs of rolls, each track section being formed complemental to the cross-section of the strip as it leaves each pair of rolls. These track sections are detachably secured to the face of the disk 24 and are provided with arcuate outwardly extending flanges, the track sections being arranged in pairs, and the strip being fed between the sections of each pair (see Figure 5). There are a pair of track sections 93 arranged adjacent the infeed rolls 74, 84 and a pair of track sections 94 arranged adjacent the infeed side of the rolls 73, 83. The confronting sides of the track sections 93 and also 94 are provided with flat surfaces, inasmuch as the strip 88 is up until the time it enters the rolls 73, 83 in flat condition. These track sections, as well as all of the others, are detachably secured to the disk 24, as by screws 95. The track sections 96 arranged between the rolls 73, 83 and 77, 87 have their confronting surfaces complemental in form to the rolls 73, 83, so that as the strip leaves the rolls 73, 83, it is accurately guided by the track section 96 to the rolls 77, 87. Likewise, the track sections 97 have their confronting surfaces formed complemental to the strip as it passes from between the rolls 77, 87. The track sections 98 are formed complemental to the cross-section of the strip, as it leaves the rolls 76, 86 (see Figure 8) and the last track sections 99 are formed to receive the strip in its final cross-sectional form, as it passes between the rolls 75, 85.

In order to obtain a complete ring member with the cross-section completely formed throughout its length, the leading end of the formed section, as it leaves the track section 99, is directed about a circular path arranged axially outwardly from the plane in which the forming rolls are arranged. This is accomplished by a circular track comprising upper and lower sections 108, 109 also detachably secured to the disk 24.

Figure 1:
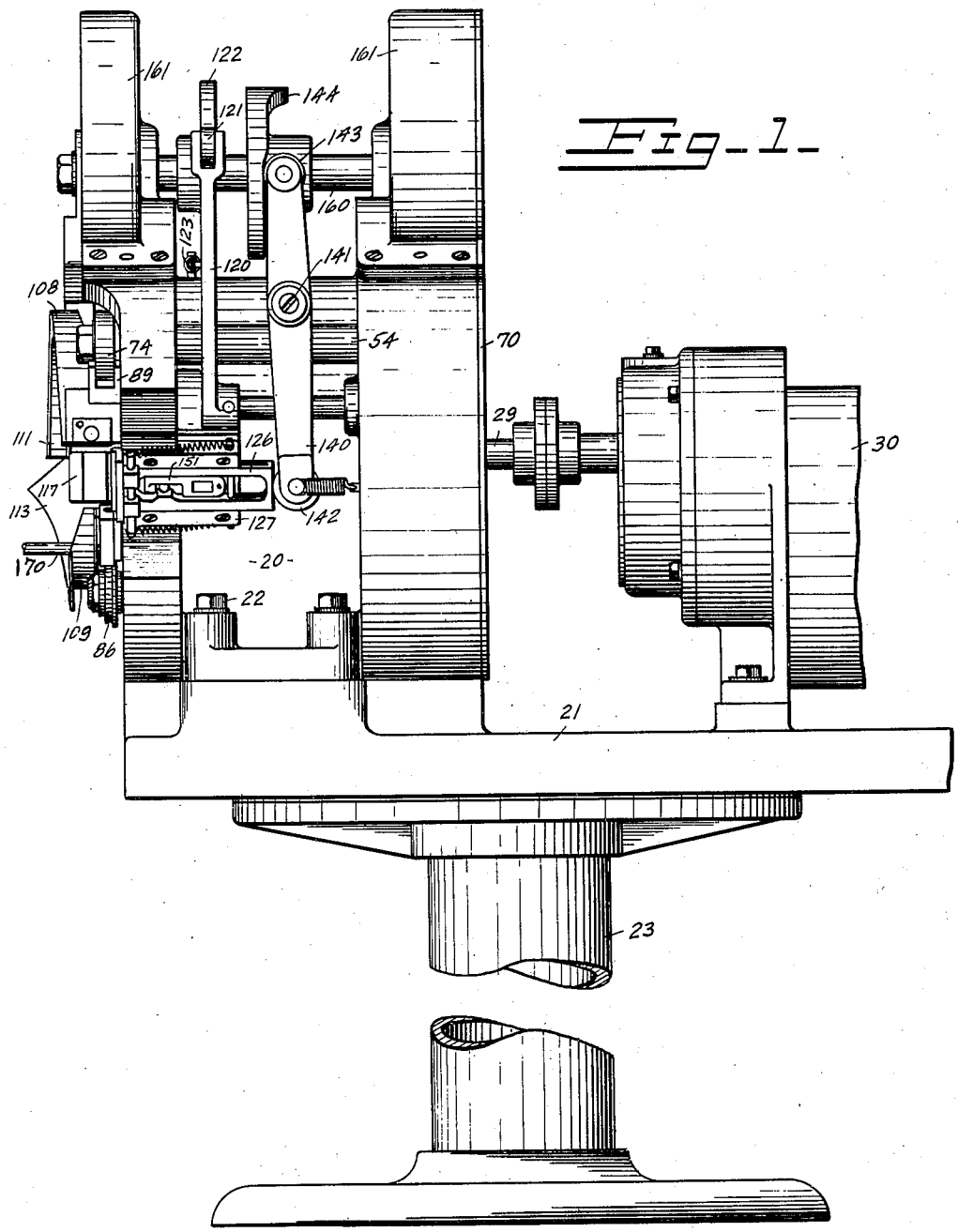
Figure 1 is a side elevational view of a machine embodying my invention.
Figure 2:
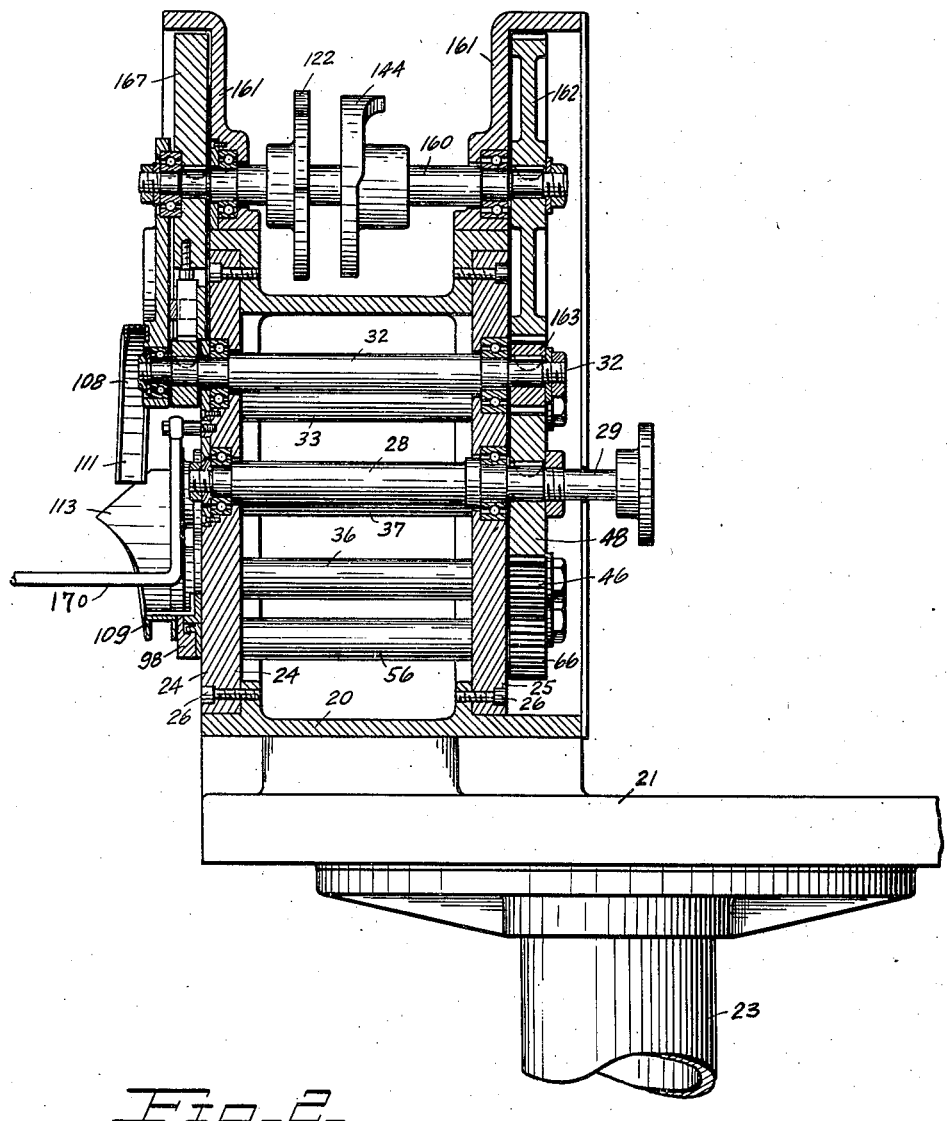
Figure 2 is a vertical sectional view of the machine shown in Figure 1.

The end 110 of the upper section 108 is arranged to receive the leading end of the formed strip as it passes from the track sections 99. The upper section is formed on a spiral, whereby the discharge end 111 of this track section is spaced outwardly from the face of the machine (see Figure 2). The adjacent end of the lower section 109 is provided with a broad portion 112 and an outer peripheral flange 113, whereby the leading end of the formed strip is directed from the upper section 108 to the lower section 109. The discharge end 115 of the lower section 109 is arranged to direct the leading end of the strip into a groove 116 formed in a block 117 secured to an arm 118 mounted upon a rock shaft 119 journalled in the disk 24. The other end of the shaft 119 is provided with an arm 120 provided at its free end with a roller 121 engaging a cam 122. The block 117 is actuated radially inwardly and outwardly by the cam 122.

Normally, the block is maintained in outward position by a spring 123 urging the free end of the arm 120 inwardly toward the cam 122. When the block 117 is in normal outward position, it is in register with the end 115 of the lower track section 109, whereby the leading end of the now completely formed ring is arranged in the groove 116.

At this time, the trailing end of the now completely formed ring is severed from the strip by a cutter or breaker 125 movable into shearing engagement with the outer track section 99. The cutter 125 is secured to the end of a rectangular block 126 slidably mounted in a block 127 detachably secured to the cylindrical member 20, as by screws 128. The block 126 is formed with a slot 129 extending throughout the major portion of its length, and with a smaller elongated slot 130 arranged in the rear portion thereof at right angles to the slot 129. A pin 132 is arranged vertically in the rear ends of the outwardly extending sides 133 of the block 127, the pin 132 passing through the slot 130.

The forward end of the block 126 is yieldingly urged inwardly toward the axis of the machine and the block yieldingly urged in a rearward direction by a pair of helical tension springs 135 secured at their forward ends to a pin 136 vertically arranged in bosses 137 formed at the forward end of the block 126 and said springs being secured at their opposite ends to a pin 138 arranged vertically in the rear end of the block 127. The springs 135 normally hold the block 126 and the cutter 125 thereon in retracted position, so that the strip is permitted to freely pass up through the track sections 99 (see Figure 11). The cutter is moved forwardly to effect a shearing action with the track sections 99 by an arm 140 pivoted to the cylindrical member 20, as at 141. The lower end of the arm 140 is provided with a roller 142 engaging the rear end of the block 126 and the upper end of the arm is provided with a roller 143 engaging a cam 144 which is operable to oscillate the arm about the pivot 141 and to effect forward movement of the cutter 125 to sever the trailing end of the formed ring from that portion being fed upwardly through the track sections 99 and to move the severed trailing end portion of the ring forwardly into engagement with the leading end portion thereof which, at this time, is positioned in the groove 116 in block 117. That is, the severed trailing end thereof, as shown in Figure 12, is inserted into the leading end portion to form a complete continuous ring. The cutter is then moved rearwardly by the springs 135 and is cammed radially outwardly so that it will not interfere with the continuous advancement of the formed portion from the track sections 99.

The block 127 is formed with an outwardly extending projection 150 arranged intermediate the sides of the slot 129 and the movable block 126. An arm 151 is pivotally mounted at one end to the projection 150 on a pin 152. The rear portion of the arm 151 is provided with an aperture to receive the projection 150 and the forward end of the arm 151 is provided with a cam surface 153. The cam portion 153 of the arm 151 is urged inwardly by a helical compression spring 155 interposed between the rearwardly extending portion 156 of the arm and the block 127. The lower side of the block 126 is provided with a projection or jaw 157 extending upwardly in the slot 129 and arranged to engage the cam portion 153 of the arm 151. The arrangement is such that as the block 126 is moved forwardly from the position shown in Figure 11, the cam portion 153 is moved outwardly against the force of the spring 155 permitting the block 126 to move forwardly in a straight path with the cutter 125 in alinement with the strip extending from the track sections 99. When the block 126 has been moved forwardly a sufficient distance to effect the severance of the completed ring and to move the severed end into engagement with the leading end, as shown in Figure 12, the cam portion 153 moves inwardly, and upon the return movement of the block 126, the pin 157 engages the forward side of the cam portion 153 and the forward end of the block carrying the cutter 125 is cammed outwardly out of the path of the strip being fed upwardly through the track section 99. When the block 126 has been urged to full retracted position, the pin 157 clears the cam portion 153 and the block is pulled inwardly against the block 127, as shown in Figure 11.

The cams 122, 144 are mounted upon a shaft 160 journalled in upwardly extending members 161 secured to the top of the cylindrical portion 20. The rearwardly extending portion of the shaft 160 is provided with a gear 162 arranged to mesh with a gear 163 mounted on the rear end of the shaft 32 and which in turn meshes with the driving gear 48. Accordingly, the cams 122, 144 operate in timed relation with each other and with the forming rolls, in order to sever the completely formed ring from the strip at the proper time.

Preferably, the flat strip is scored as it passes between the rolls 74, 84 and 73, 83. The scoring is accurately arranged, so that when the ring is completely formed, the score is arranged just at the top of the track sections 99. The purpose of scoring the strip is to more easily sever the completed ring from the strip by the cutter 125. The shaft 32 is provided on its forwardly extending end with a cylindrical roll 165 arranged between the track sections 93, 94 and the forward end of the shaft 160 is provided with a disk 167 to which is adjustably secured a cutter knife 168 (see Figure 5). The arrangement and timing is such that the cutter knife 168 scores the strip once during each cycle of the disk, as the strip passes between the disk 167 and the anvil roll 165 and the distance between the scores is in proportion to the diameter of the ring being formed.

When the severed end of the formed ring has been sheared from the strip and pressed into the leading end of the ring by the cutter 125, the block 117 is moved inwardly by cam 122 out of engagement with the completed ring. During the formation of the ring, the same has been traveling about the under side of the upper track section 108 and the lower side of the track section 109 at comparatively high speed, and as the ring is severed from the strip and the block 117 is moved inwardly from the ring, the same is free to drop downwardly from the upper and lower tracks 108, 109 and at the same time is directed axially outwardly by the inclined portion 133 of the lower track 109. An arm 170 is secured to the front disk 24 and serves as a convenient means to collect the completed rings as the same are discharged by the machine.

Means is also provided to increase or decrease, within limits, the diameter of the completed ring. This is accomplished by controlling the amount the ends of the ring overlap. The lower track 109 is provided with a spring member 171 having a freely movable portion 172 extending along the underside of the track adjacent the end 112 thereof. The portion 172 is adjustable radially of the track by an adjusting screw 173. When the spring 172 is moved outwardly, the diameter of the formed portion of the strip or ring is increased, whereby that portion of the leading end thereof overlapped by the trailing end is of less length. Accordingly, the diameter of the completed ring may be controlled very accurately while the machine is in operation.

It is only necessary for the operator to feed the end of the strip between the first pair of rolls 74, 84 and start the machine. Thereafter, the machine operates automatically at high speed to form the rings and discharge them on the arm 170, and it is only necessary for the operator to thereafter periodically remove the completed rings collected on the arm 170.

It will be observed that while the machine described is operable to continuously form rings at high speed, it is exceptionally compact and economical, and due to the fact that all of the shafts, including the form roll shafts, are mounted in anti-friction bearings, there is substantially no cost of maintenance, the machine being operable over long periods of time in high production without necessitating any adjustment or repair.

What I claim is:

1. A machine for continuously forming ring members of a desired cross section from a flat strip comprising means operable to continuously advance said strip and to form said strip into a circular portion and of the desired cross section, cutter means operable to sever the circular portion from the strip during such continuous advancement thereof and to interlock the ends of said circular portion.

2. A machine for continuously forming ring members of a desired cross section from a flat strip comprising a plurality of pairs of forming rolls arranged in an annular series in a common plane and operable to continuously advance the strip and to simultaneously progressively form said strip into the desired cross section, track means arranged to guide the formed portion of the strip about a circular path spaced axially from the plane of said forming rolls, and cutting means operable during continuous movement of the formed portion to sever the trailing end thereof from the strip and interlock the same with the leading end of said portion to form the ring member.

3. A machine for continuously forming ring members of a desired cross section from a flat strip comprising a plurality of pairs of forming rolls arranged in an annular series in a common plane and operable to continuously advance the strip and to simultaneously progressively form said strip into the desired cross section, track means arranged to guide the formed portion of the strip about a circular path spaced axially from the plane of said forming rolls, cutting means operable during continuous movement of the formed portion to sever the trailing end thereof from the strip and interlock the same with the leading end of said portion to form the ring member, and means operable to release the formed ring member from said track means.

4. A machine for continuously forming ring members of a desired cross section from a flat strip comprising a plurality of pairs of forming rolls arranged in an annular series in a common plane and operable to progressively form said strip into the desired cross section, track means arranged to guide the formed portion of the strip about a circular path spaced axially from the plane of said forming rolls, and cutting means operable during continuous movement of the formed portion to sever the trailing end thereof and interlock the same with the leading end of said portion to form the ring member, and means carried by the track and operable to vary the diameter of the formed ring.

5. A machine for forming ring members of a desired cross section from a thin flat metallic strip comprising a frame, a plurality of pairs of forming rolls journalled in the frame and arranged in an annular series in a common plane, means for feeding the flat strip between the first pair of said rolls, a circular track operable to guide the leading end of the formed strip axially out of the plane of said forming rolls and to guide the same in a circular path, cutting mechanism arranged in juxtaposition to the last pair of said forming rolls and operable, during continuous movement of said strip, to sever the trailing end of the formed portion from the strip and to interlock the same with the leading end thereof.

6. A machine for continuously forming ring members of a desired cross section from a strip of metal comprising a plurality of pairs of forming rolls arranged in an annular series in a common plane, a track section arranged intermediate each pair of rolls, means operable to feed said strip between the first pair of rolls, and said rolls being operable to progressively form said strip into a ring of the desired cross section, each track section being formed complemental to the cross section of the strip as the same passes from each pair of rolls, means operable to guide the leading end of the formed strip axially out of the plane of said rolls, and cutting means operable to sever the trailing end of the formed ring and interlock the same with the leading end thereof.

7. A machine for continuously forming rings of a desired cross section from a flat strip of metal comprising an annular series of pairs of forming rolls arranged in a common plane, means for feeding the flat strip between the first pair of rolls, and track means interposed between each succeeding pair of rolls and operable to guide the strip from one pair of rolls to the next, said rolls being operable to progressively form the strip into desired cross section, a circular track member arranged to guide the leading end of the formed portion of the strip axially out of the plane of said forming rolls and to guide said formed strip into a circular ring, a cutter arranged in juxtaposition to the last pair of said rolls and operable to sever the trailing end of the formed ring from the strip and interlock the same with the leading end of the formed portion.

8. A machine for continuously forming ring members of a desired cross section from a flat strip comprising a substantially cylindrical frame, a plurality of pairs of shafts journalled in the frame with the axes of said shafts extending parallel to the axis of the frame, forming rolls secured to like ends of said shafts and being cooperable to effect continuous advancement of said strip and to simultaneously progressively form said strip into the desired cross section, a circular track mounted on the frame and operable to direct the formed portion of the strip about a circular path arranged axially from the plane in which said forming rolls are mounted, a block movably mounted on the frame, said block being normally arranged to receive the leading end of the circular formed portion of the strip after the same has passed around said track, a cutter slidably mounted in the plane and operable to sever the trailing end of said formed portion from the strip and to position the same in engagement with the leading end thereof, and means operable to move said block out of engagement with said circular portion.

9. A machine for continuously forming ring members of a desired cross section from a flat strip comprising a plurality of pairs of forming rolls arranged in an annular series in a common plane and operable to continuously advance the strip and to simultaneously progressively form said strip into the desired cross section, a pair of feeding rolls operable to feed the flat strip between the first pair of forming rolls, means arranged intermediate said feeding rolls and said first pair of forming rolls and operable to partially sever the strip, track means operable to guide the formed strip into circular form, and cutter means operable to complete the severance of the circular portion from the strip during the continuous advancement thereof and to interlock the ends of said circular portion.

10. A machine for continuously forming ring members of a desired cross section from a flat strip comprising a plurality of pairs of forming rolls arranged in an annular series in a common plane and operable to continuously advance the strip and to simultaneously progressively form the strip into the desired cross section, a stationary track section arranged in juxtaposition to the last pair of forming rolls and being formed with a recess complemental to the formed strip, a circular track operable to guide the formed strip axially out of the plane of said forming rolls, a movable track section formed with a recess complemental to the formed strip and normally positioned to receive the leading end of the formed circular strip as the same leaves said circular track, a cutter movable in shearing relation to said stationary track section toward said movable track section and operable during the continuous advancement of said strip to sever the trailing end of said circular formed strip and move the same into engagement with the leading end thereof positioned in said movable track section to form the completed ring member, and means operable to move said cutter in timed relation to the advancement of said strip.

EDWARD N. LOWRY.